Sept. 4, 1928.

P. L. TENNEY 1,682,999

TRANSMISSION

Filed June 16, 1926

Inventor
Perry L. Tenney

By Blackmore, Spencer & Hül
Attorneys

Sept. 4, 1928.

P. L. TENNEY 1,682,999

TRANSMISSION

Filed June 16, 1926    2 Sheets-Sheet 2

Inventor
Percy L. Tenney

By Blackmore, Spencer & Hill
Attorneys

Patented Sept. 4, 1928.

1,682,999

UNITED STATES PATENT OFFICE.

PERRY L. TENNEY, OF MUNCIE, INDIANA, ASSIGNOR TO GENERAL MOTORS CORPORATION, OF DETROIT, MICHIGAN, A CORPORATION OF DELAWARE.

TRANSMISSION.

Application filed June 16, 1926. Serial No. 116,381.

This invention relates to a changed speed gearing. It has been arranged particularly for use on motor vehicles but its use is of course not restricted to that single application.

It is an object of the invention to provide novel shifter forks having very long bearings. Specifically the long bearings of the fork is obtained by making use of a single rail fixedly positioned between the two forks and by providing a bearing between each fork member and the side wall of the gear casing cover. By this means the leakage around the ends of the usual sliding rods is avoided.

A further object the attainment of which is made possible by the above referred to construction, is the completely enclosed spring detent for the fork.

A still futher object is an improved interlock. The invention also has as an object the avoidance of noise in the act of shifting gears, this being accomplished by spacing the throat of the fork from the groove of the gear.

In the drawing; which shows one specific embodiment of the invention:

Figure 1:
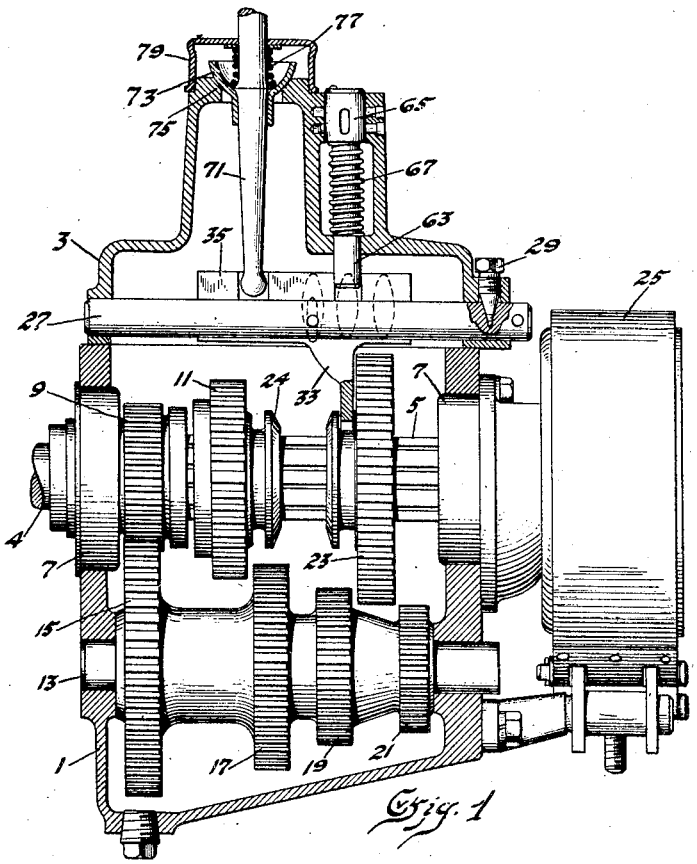
Figure 1 shows in longitudinal section a transmission housing incorporating the subject matter of the invention.

Referring by reference characters to the drawing, numeral 1 represents a transmission housing. This housing has a cover 3 which is secured to the housing in any convenient manner. Entering from the front is the clutch driven shaft 4 and a transmission shatf 5, driven by shaft 4, is used to deliver the power of the motor to the rear axle (not shown). The gear shift housing has bearings 7 for shafts 4 and 5. On shaft 4 is a driving gear 9 to which may be clutched clutch gear element 11 slidable on shaft 5 for direct drive. For reducing speed and reverse driving there is provided a second shaft 13, having gear 15 constantly driven by gear 9, and also other gears 17, 19 and 21. Gears 17 and 19 are arranged to drive shaft 5 by engagement therewith of gears 11 and 23, the gears 11 and 23 being movable along shaft 5 for the purpose of effecting driving engagement. Gear 21 operates through reverse idler (not shown) to drive gear 23 and shaft 5. No novelty is alleged for this gearing system. If desired, a transmission brake 25 may be applied to the driven shaft.

Within the cover of the casing is fixed, in a longitudinal position, a single rail 27, preferably circular in section. This rail may be removably held in position by a set screw 29. The gears 11 and 23 have grooves formed by the face of the gears and by flanges 24, in which grooves are positioned the semicircular forked portions 31 of the shifting members 33. These forks are extended upwardly from their throat portions to form long sliding heads 35. On the adjacent sides of the heads are longitudinal grooves 37 engaging opposite sides of the rail 27, thereby forming a long bearing surface. On the side of each head 35 opposite the groove 37 is a tapered wall 39 engaging a similar shaped wall 41 formed on the cover 3. By means of the rail and the tapered wall of the cover a very substantial guide is provided for the moving shifter fork.

Figure 3:
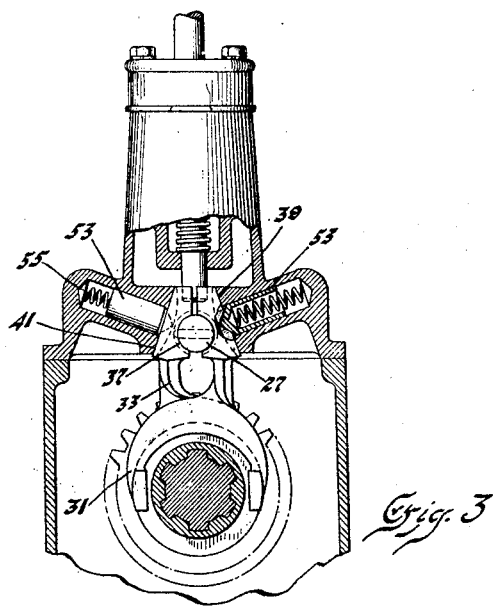
Figure 3 is a transverse section.
Figure 4:
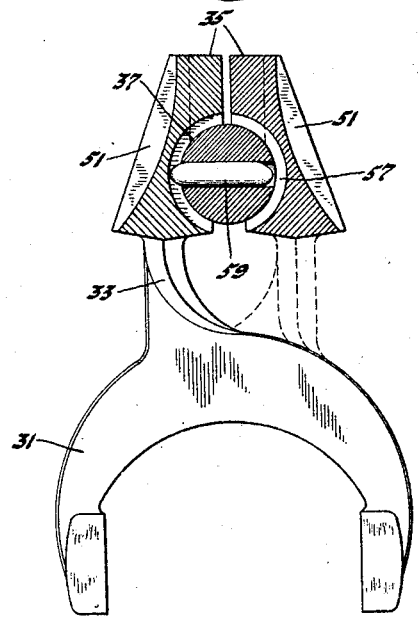
Figure 4 is a section on the line 4—4 of Figure 2.

Upon the outer walls of the heads of the forks are notches or grooves 51 for engaging spring actuated detents 53, the springs 55 actuating the detents, being shown in Figure 3. By this arrangement it is seen that the spring actuated detents are fully enclosed in the wall of the cover, and that they engage perpendicularly the tapered wall of the forks. The angular position of the axis of these detents is such that the holes to receive the detents may be conveniently bored from the bottom of the cover.

The construction already described affords very convenient and exceedingly simple means for providing the inter-lock between the shifter forks. An annular groove 57 is formed in each head 35 and the grooves are so positioned that they lie opposite to each other when the two shifter forks are in neutral position. A transverse aperture is made in the rail 27 and located in this aperture is a pin 59. The ends of the pin are of tapered rounded shape and the length of the pin is slightly greater than the diameter of the rail. By this construction, when both forks are in neutral the pin 59 may project into either one of the annular grooves of the heads 35. If now, one of the forks is moved to any other position, the pin automatically locks the other fork from movement relative to the rail. This construction is obviously extremely simple and requires no springs or other parts which may become worn or interfere with the operation of the gear shift.

Figure 2:
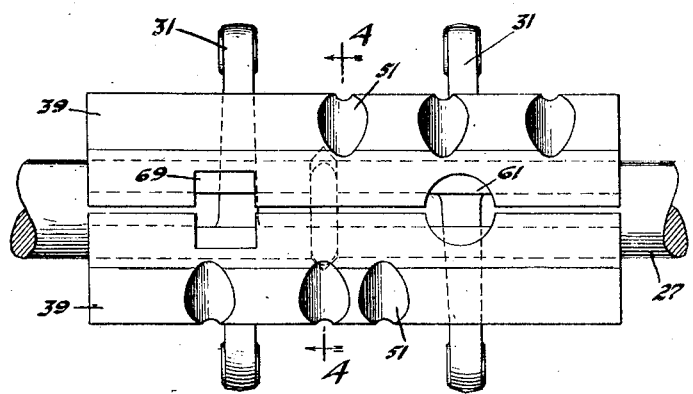
Figure 2 is a top plan view looking down upon the shifting forks.

From Figure 2 it will be seen that when the forks are in neutral position there are oppositely positioned semi-circular grooves 61 positioned in alignment for engagement by a locked bolt 63 of a lock member 65. The locking bolt is normally for engagement with the end of the shift lever 71. This shift lever passes through the top of the cover where it is given a universal mounting, as by a cup 73 engaging semi-spherical surface 75 formed on the cover. A spring 77 is positioned between a cap member 79 and the cup and serves to hold the cup in a functional position.

The operation of the gear shift device will be readily understood without further explanation. The fixed rail and the walls of the cover provide a very substantial bearing for the sliding forks and avoid the spilling of oil which occurs in the case of a common form where the sliding rods have bearings in the gear cover. The long bearing gives such a rigid support for the forks that the throat of the fork is shaped so as not to come into contact with the bottom of the groove of the gear, thereby making the operation almost noiseless. The provision of the single rail between the two shifter forks affords the possibillty of an extremely simple inter-lock. The angular position of the longitudinal axis of the spring detents simplifies manufacture and by this means the spring detents are wholly enclosed.

I claim:

1. A gear shifting device comprising a gear casing including a cover, a fixed rail, a shifter fork having a long sliding bearing with the casing cover on one side, and with said rail on the other side, the plane of the bearing between the casing cover and fork being at an acute angle to the plane of the lower surface of the cover.

2. Combination of elements enumerated in claim 1 together with a spring pressed detent in said cover, its longitudinal axis being perpendicular to the plane of the bearing surface and radially disposed with reference to said rail.

3. A gear shifting device comprising a gear casing having oposite walls, a guide rail between said walls, oppositely disposed fork members, said fork members slidably engaging the casing walls and having elongated recesses on their adjacent sides to engage the guide rail.

4. A gear shifting device comprising a gear casing, a fixed guide rail substantially circular in cross section, oppositely disposed fork members slidably engaging the walls of the casing and having on their adjacent sides elongated grooves slidable upon opposite sides of said guide rail.

In testimony whereof I affix my signature.

PERRY L. TENNEY.